June 6, 1950 — R. H. B. EVANS — 2,510,391
LOGARITHMIC CALCULATOR
Filed Nov. 6, 1946 — 2 Sheets-Sheet 1
*Fig. 1.*
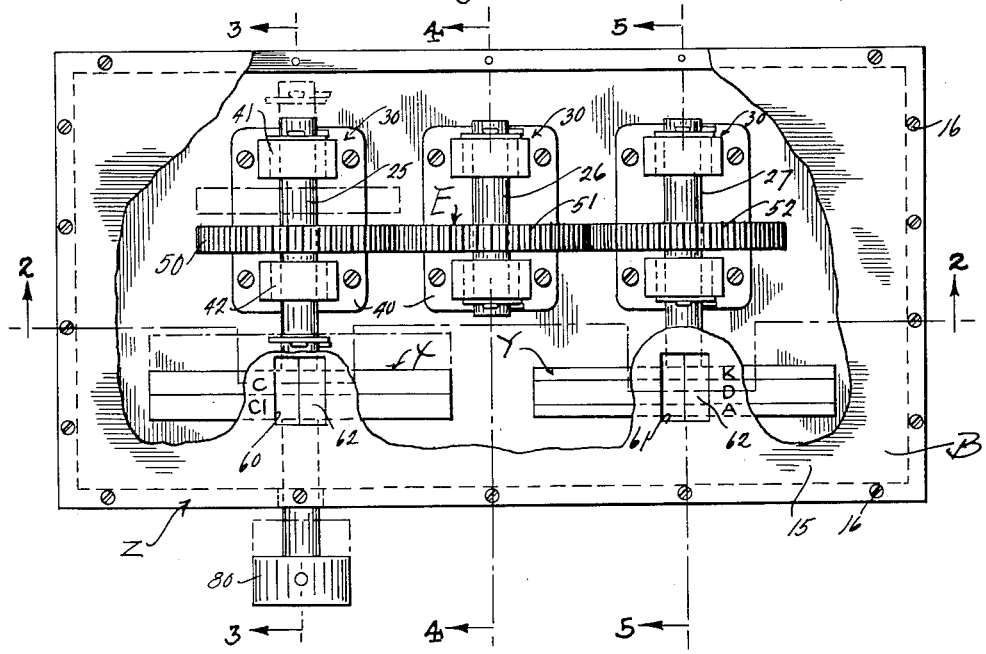
*Fig. 2.*
*Fig. 6.*
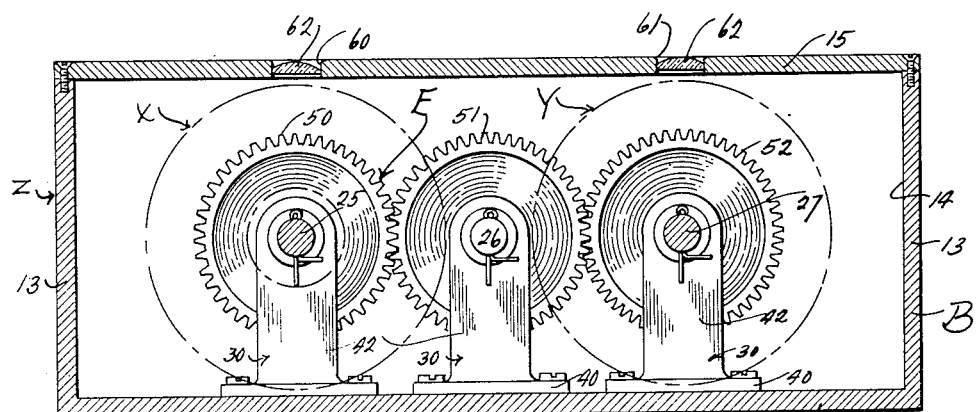
INVENTOR.
ROBERT H. B. EVANS
BY Lancaster, Allwine & Rommel
ATTORNEYS.

June 6, 1950  R. H. B. EVANS  2,510,391
LOGARITHMIC CALCULATOR
Filed Nov. 6, 1946  2 Sheets-Sheet 2

INVENTOR.
ROBERT H. B. EVANS
BY *Lancaster, Allwine and Rommel*
ATTORNEYS.

Patented June 6, 1950

2,510,391

UNITED STATES PATENT OFFICE 2,510,391

LOGARITHMIC CALCULATOR

Robert H. B. Evans, Buffalo, N. Y.

Application November 6, 1946, Serial No. 708,147

2 Claims. (Cl. 235—61)

This invention relates to improvements in computing machines.

The primary object of this invention is the provision of an improved rotary scale calculator operating on a different structural principle than the conventional logarithmic slide rule.

A further object of this invention is the provision of an improved cylindrical type of rotary scale calculator which is efficient in operation, compact and may with facility be used for computations, including multiplication and division.

Other objects and advantages of the invention will be apparent from the following detailed description.

In the accompanying drawings, forming a part of this specification, and wherein similar reference characters designate corresponding parts throughout the several views:

Figure 1 is a fragmentary plan view of the improved rotary scale calculator.

Figures 2, 3, 4 and 5 are cross sectional views taken substantially on their respective lines shown in Figure 1 of the drawings.

Figure 6 is a developed diagrammatic view showing a proposed logarithmic scale layout for certain scales upon the rotary members of the calculator.

Figure 3:
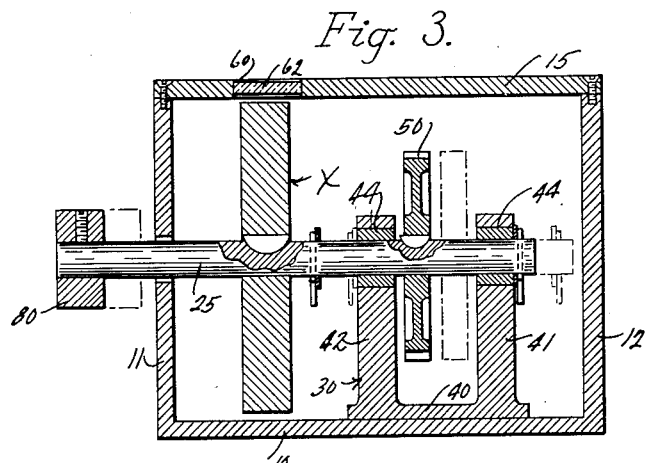
Figure 4:
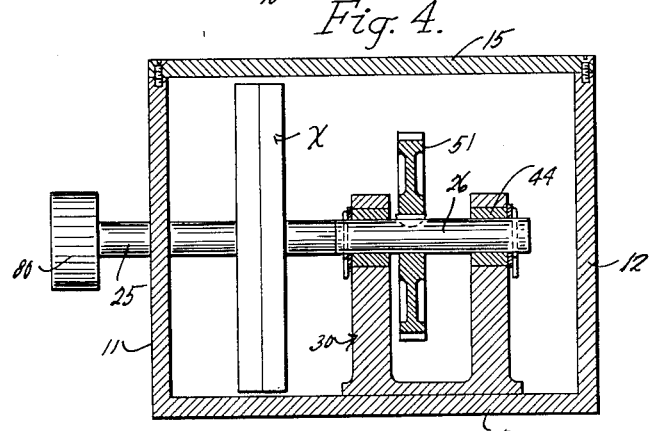
Figure 5:
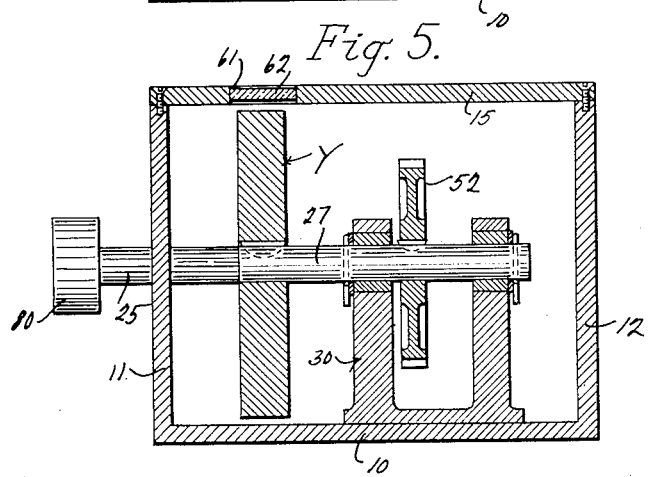

In the drawings, wherein for the purpose of illustration is shown only a preferred embodiment of the invention, the letter Z may generally designate the calculator. It includes a cabinet-like framework B having rotary scale members in the form of wheels, drums or rings X and Y operatively connected by operating means E.

The framework B consists of a bottom wall 10, front and rear walls 11 and 12 respectively, and end walls 13. They define a compartment 14 adapted to receive a detachable closure 15 which preferably rests upon the top marginal edges of the front, rear and side walls and may be detachably secured thereto by screws 16.

The wheels, drums or scales X and Y comprising the rotary scale members may be of any approved material. They are of exactly the same diameter, and their peripheral circumferences measure the same. Upon the circumferences are adapted to be disposed conventional logarithmic scales similar to those of a conventional slide rule, and which will herein be identified as scales "C"; "C.I."; "K"; "D" and "A". The delineations of these scales are placed upon the outer circumference of the rotary scale wheels in any approved manner, such as by engraving, embossing or on suitable printed strips.

The rotary scale wheels are disposed in parallel planes, and not co-axial. The means E for mounting the scales consists of shafts 25, 26 and 27 rotatably mounted in suitable bracket structures 30, with the axes of the shafts paralleling each other; the spacing between the shafts 25 and 26 being the same as between the shafts 26 and 27. The brackets 30 are preferably of some light weight material such as aluminum, and include base plates 40 which may be secured to the bottom 10 as by bolting or welding, in case the frame structure is made of metal. They each include parallel standards 41 and 42 which receive suitable bushings or anti-friction members 44 therein, so as to accurately mount the shafts, and to facilitate the operation of the shafts.

The shafts 25 and 26 have a rather free, not loose, but running fit in the bushing of their respective brackets. The shaft 27 is rotatable in the bushing of its bracket with a friction fit, so as to necessitate manual intervention in the rotation of the shafts.

The shafts 25, 26 and 27 are interconnected by means of spur gears 50, 51 and 52 respectively keyed upon the shafts 25, 26 and 27 and intermeshing so that rotation of the shaft 25 will cause rotation of the shaft 27 in the same direction.

The shafts 26 and 27 are provided with suitable cotter pin assemblages shown in the drawings to prevent their longitudinal movement in the standards of their respective bearings. In contradistinction the shaft 25 has the cotter pins or motion limiting means so placed that the shaft 25 may move axially to disengage the gear wheel 50 from the gear wheel 51 and thus permit rotation of the scale X independent of the scale Y.

The closure 15 is preferably provided with sight openings 60 and 61 therein; respectively above the scale wheels X and Y, and these sight openings may be provided with magnifying lenses 62 as shown in the drawings.

The position of the various scales and the bands which they occupy on the wheels X and Y is clearly shown in Figure 1 of the drawings.

Referring to Figure 6, the logarithmic delineations for the scales C and D are shown in the band width 70 and similarly the logarithmic delineations for the scale C. I. are shown at 71.

While the proportion of parts may vary, the external diameters of the wheels X and Y must always be the same and they must always rotate at the same angular velocity.

The shaft 25 is the only one which extends through the cabinet and in front of the front wall of the cabinet it is provided with a finger engaging knob 80 of any approved material.

In one instance the structural measurements may take the following form. The scale wheels may have an external diameter of 3.19" which gives a circumferential periphery of 9.84" for each of the scale wheels. The spur gears may have an external diameter of 2⅛" and 120 teeth may be provided upon each of the gear wheels. With this arrangement in mind, it can readily be understood that it is perfectly possible to drive the wheels in the manner specified with other gearing means than that shown.

As to the method of operation, when multiplying two or more numbers, the scale wheels are adjusted so that the indices I are directly below the hair lines of each of the magnifying lenses. The knob 80 is then turned to the left until the first number on the scale C appears under the hair line of its lens 62. Of course this will bring the same reading under the hair line of the other lens on the scale D. The operator then pushes upon the knob to disengage the gears 50 and 51 and the wheel X is then turned in reverse direction to bring the index I back to the hair line of the lens. The gears 50 and 51 are then again meshed and through the knob the operator turns the wheel X to the left until the next number appears under the hair line. The gears 50 and 51 are then disengaged again and the index I of the scale C returned to a point under the hair line for the wheel X. After all of the numbers have thus been registered the product will be found under the right hand magnifying lens upon the scale D.

Division is accomplished by turning the knob of the shaft 25 to the right and reading along the C. I. scale; the result being shown on the scale D of the other wheel Y.

It is always necessary to note the number of revolutions made by the D scale in each problem for the reason that before one revolution is completed the scale reads from 1 to 10, and after one revolution it should be read from 10 to 100. Two revolutions necessitate its reading from 100 to 1,000 etc.

The square and cube of numbers may be read directly above and below the scale D upon the wheel Y off of the band scales A and K. The scale A for the square and the scale K for the cube.

Various changes may be made to the form of invention herein shown and described without departing from the spirit of the invention or the scope of the following claims.

I claim:

1. In a rotary scale calculator, the combination of a elongated support; a plurality of pairs of spaced-apart, shaft-receiving bushings fixedly carried by said support, each pair having the axes of their shaft-receiving openings substantially coincident and the axes of the shaft-receiving openings of one pair substantially parallel with the axes of the shaft-receiving openings of the other pairs, with all of said axes intersecting an imaginary line extending longitudinally of said support; a plurality of substantially parallel shafts one being rotatably carried by each pair of bushings; a scale-bearing rotor wheel fixedly mounted upon each alternate shaft; a gear fixedly mounted upon each shaft, and all of said gears being of substantially the same diameter and normally geared together in the same plane; one of said shafts mounting one of said rotor wheels and gears having a friction fit with its pair of bearings and the shaft mounting the next adjacent gear having a free running fit with its pair of bearings; and means to reciprocate one of said shafts longitudinally along its axis of rotation in order to selectively connect the gear mounted thereon with the next adjacent gear or disconnect the gear mounted thereon from the adjacent gear and so permit rotation of the one of said rotor wheels independently of the next adjacent rotor wheel.

2. In a rotary scale calculator, the combination of a support; a plurality of pairs of spaced-apart, shaft-receiving bushings fixedly carried by said support, each pair having the axes of their shaft-receiving openings substantially coincident and the axes of the shaft-receiving openings of one pair substantially parallel with the axes of the shaft-receiving openings of the other pairs; a plurality of substantially parallel shafts one being rotatably carried by each pair of bushings; a scale-bearing rotor wheel fixedly mounted upon each alternate shaft; a gear fixedly mounted upon each shaft, and all of said gears normally geared together in the same plane and in a straight row; one of said shafts mounting one of said rotor wheels and gears having a friction fit with its pair of bearings, the next alternate shaft mounting one of said rotor wheels and gears having a free running fit with its pair of bearings; and means to selectively engage and disengage the gear upon the said alternate, free running shaft with and from the next adjacent gear.

ROBERT H. B. EVANS.

REFERENCES CITED

The following references are of record in the file of this patent:

UNITED STATES PATENTS

| Number | Name | Date |
| --- | --- | --- |
| 641,517 | Keel | Jan. 16, 1900 |
| 773,235 | Sperry | Oct. 25, 1904 |
| 902,022 | Sturtevant | Oct. 27, 1908 |
| 1,347,014 | Corliss | July 20, 1920 |
| 1,482,152 | Ross | Jan. 29, 1924 |
| 1,671,616 | Sperry | May 29, 1928 |
| 1,742,824 | Rozman | Jan. 7, 1930 |
| 2,289,257 | Fiala | July 7, 1942 |